United States Patent

Schick et al.

Patent Number: 5,549,060
Date of Patent: Aug. 27, 1996

[54] MECHANICAL SEED METER

[75] Inventors: Jeffrey C. Schick, Davenport, Iowa; Donald R. Wisor, Moline, Ill.

[73] Assignee: Deere & Company, Moline, Ill.

[21] Appl. No.: 510,447

[22] Filed: Aug. 2, 1995

[51] Int. Cl.⁶ .................................................. A01C 7/00
[52] U.S. Cl. .......................... 111/178; 221/254; 221/263; 221/277
[58] Field of Search ..................... 111/184, 177, 111/178, 183, 185, 170; 221/277, 263, 266, 254

[56] References Cited

U.S. PATENT DOCUMENTS

| Re. 32,067 | 1/1986 | Emory . | |
|---|---|---|---|
| 3,486,659 | 12/1969 | Beebe et al. . | |
| 3,489,321 | 1/1970 | Kirschmann . | |
| 3,552,601 | 1/1971 | Hansen et al. . | |
| 3,763,797 | 10/1973 | Navasero . | |
| 4,162,744 | 7/1979 | Barker et al. | 221/254 X |
| 4,282,985 | 8/1981 | Yamamoto . | |
| 4,450,979 | 5/1984 | Deckler | 221/263 |
| 4,609,131 | 9/1986 | Tieben . | |
| 4,924,786 | 5/1990 | Keeton | 111/184 |
| 4,991,522 | 2/1991 | Alexander . | |
| 4,995,327 | 2/1991 | Jeffers, Sr. . | |
| 5,027,725 | 7/1991 | Keeton | 111/184 |
| 5,058,766 | 10/1991 | Deckler | 111/184 X |
| 5,170,909 | 12/1992 | Lundie et al. | 221/266 X |

FOREIGN PATENT DOCUMENTS

| 106299 | 4/1984 | European Pat. Off. | 111/185 |
|---|---|---|---|
| 2562755 | 10/1985 | France | 111/178 |
| 1511861 | 10/1969 | Germany | 221/266 |
| 3615189 | 4/1987 | Germany | 111/184 |
| 1022673 | 6/1983 | U.S.S.R. | 111/178 |
| 583100 | 12/1946 | United Kingdom | 111/183 |
| 677842 | 8/1952 | United Kingdom | 111/183 |
| 2054332 | 2/1981 | United Kingdom | 111/177 |

*Primary Examiner*—Terry Lee Melius
*Assistant Examiner*—Christopher J. Novosad

[57] ABSTRACT

The invention is directed to a simple mechanical seed meter having a casing that is provided with holding and dividing combs in which is rotated a metering drum. The metering drum is provided with angled flutes which define seed receiving valleys. One side of the drum is the dispensing side and the flutes at that side are provided with upwardly extending fingers which define seed pockets for individual seeds. The seed pockets carry the singled seeds from the seed receiving space defined by the dividing comb to the seed dispensing space where there are released to the outlet of the casing. The combs are secured to the casing by a hook and loop fastener assembly.

10 Claims, 2 Drawing Sheets

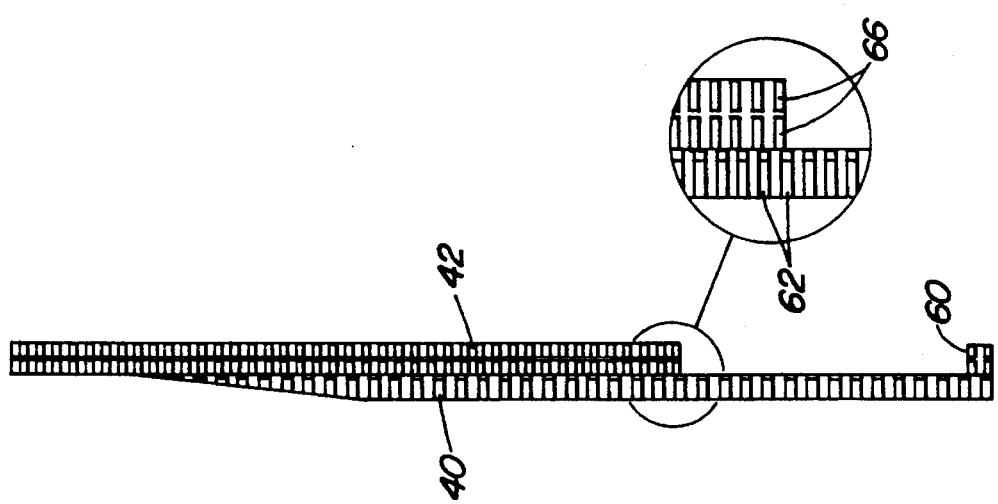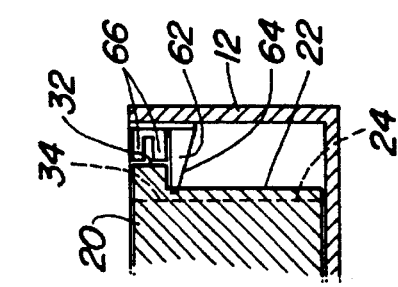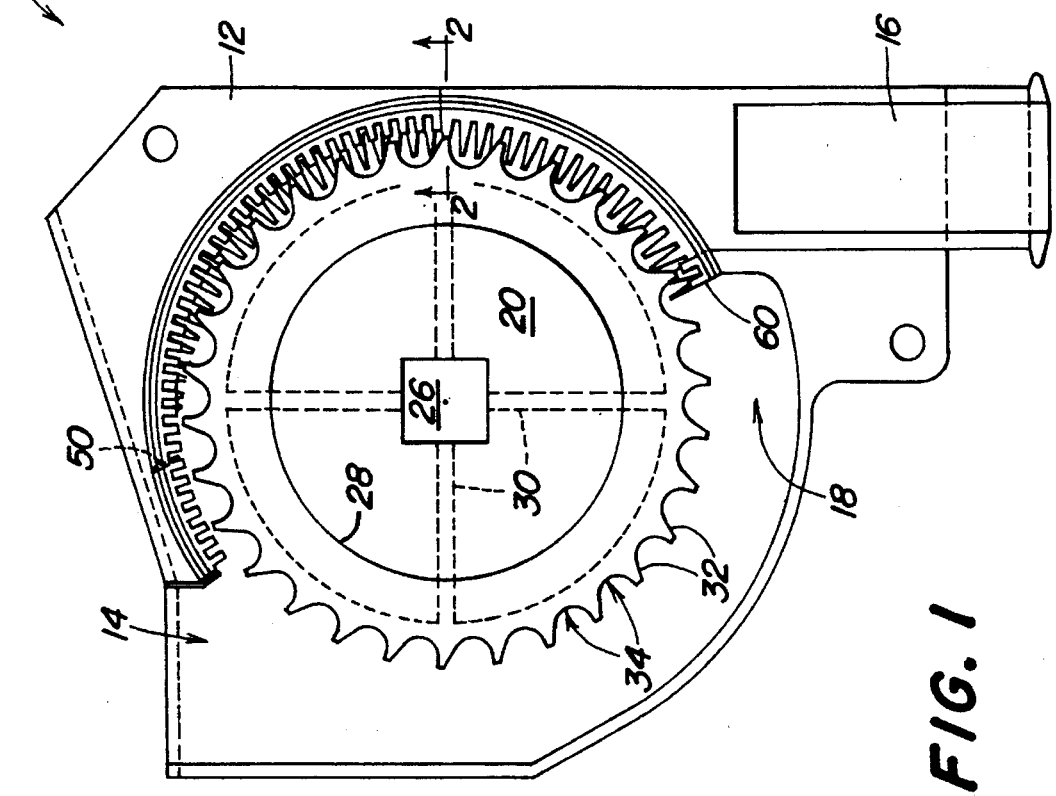

5,549,060

MECHANICAL SEED METER

BACKGROUND OF THE INVENTION

1. Field of the Invention

The invention is directed to a mechanical seed meter which can be used on planters, grain drills and air seeders.

2. Description of the Prior Art

In the United States the vast majority of crops are planted with row crop planters, grain drills or air seeders. Row crop planters are designed to place seeds in rows far enough apart to permit the control of weeds by cultivation and to improve harvesting efficiency. Grain drills and air seeders are used in solid planting, when row spacing is too close to permit cultivating or other cultural practices.

All three seeding machines, meter seed so it can be planted uniformly in a field. The row crop planters usually have the more sophisticated metering equipment for singling seeds, whereas the drills and air seeders use volumetric meters which apply a fixed volume of seed per linear foot. Volumetric meters typically comprise fluted drums which rotate through the seed reservoir, as illustrated in U.S. Pat. Nos. 3,489,321 and 3,763,797. Of particular interest is U.S. Pat. No. 3,489,321 which discloses a metering drum having helical flutes.

Singling mechanical seed meters used on planters include seed plate meters, finger pickup meters and "brush meters". A seed plate seed meter is a mechanical seed meter having a rotating plate located at the bottom of the seed hopper. The plate is provided with seed cells in which the seed is trapped. If the cells are the correct size, only one seed will be trapped in each cell. The plate is then rotated over the discharge area and the seed released. U.S. Pat. Nos. 3,486,659, 4,282,985, and 4,609,131 disclose various configurations for seed plate type seed meters. Of particular interest is U.S. Pat. No. 4,609,131 which is a hybrid seed dispensing device also having a fluted drum for dispensing seed volumetrically.

Another mechanical seed meter is the finger pickup seed meter. This meter is used for corn and comprises a series of fingers that pass through the seed reservoir. The fingers are initially open in the seed reservoir and then close trapping seed between the fingers and a stationary plate. Additional seed trapped by the fingers is removed by passing the fingers over indentations in the stationary plate as the seed is transported to the discharge area where the finger is opened releasing the seed. One example of a finger pickup meter is disclosed in U.S. Pat. No. 3,552,601.

Recently "brush meters" have been used for metering soybeans. A vertical rotating seed plate having a plurality of seed cells around its periphery passes through the seed reservoir. Seed is trapped in the seed cells by brushes. Examples of "brush meters" are disclosed in U.S. Pat. Nos. 4,924,786, 5,027,725 and 5,058,766.

SUMMARY

It is an object of the present invention to provide a simple mechanical seed meter for singling large seeds and volumetrically metering small seeds. The subject seed meter can be used on row crop planters, grain drills and air seeders.

The seed meter of the present invention comprises a casing and a metering drum. The casing is provided with an inlet for receiving seeds and an outlet for dispensing seed. The drum is rotatively mounted in the casing and is provided with angled flutes defining seed receiving valleys. The seed dispensing side of the drum is provided with outwardly extending fingers that define seed receiving pockets. The fingers and the seed receiving pockets are as wide as the seed is to be singled, for example the width of a soybean.

A flexible isolator divides the space between the metering drum and the casing into a seed receiving space and a seed dispensing space. The flexible isolator comprises a dividing comb having urethane tines.

A holding comb holds the seed in the seed pockets as the seed rotates across the flexible isolator from the seed receiving space to the seed dispensing space. After the seed reaches the seed dispensing space the holding comb ends and the seed is released to the outlet.

The flexible isolator and the holding comb are mounted to the inner periphery of the casing. The flexible tines of the flexible isolator extend into the seed receiving valleys formed by the flutes on the metering drum. As the metering drum is rotated through the seed receiving space it first encounters the holding comb. As it rotates more it encounters the tapered flexible isolator which drives seed, not held by the holding comb, outwardly from the seed dispensing side to the seed receiving side. The holding comb holds seed in the seed pockets formed by the outwardly projecting fingers.

Two additional combs are mounted to the inner periphery of the casing. They are the flow regulating comb and the sealing comb. The flow regulating comb extends across the seed receiving space adjacent to the tapered portion of the dividing comb. The sealing comb extends between the dividing comb and the casing wall immediately downstream from the outlet to prevent seed from short circuiting the meter and entering the outlet directly.

BRIEF DESCRIPTION OF THE DRAWINGS

FIG. 1 is a cross sectional side view of the seed meter.

FIG. 2 is a sectional view taken along line 2—2.

FIG. 5 is an unrolled top view of the dividing and holding combs.

DETAILED DESCRIPTION

Figure 4:
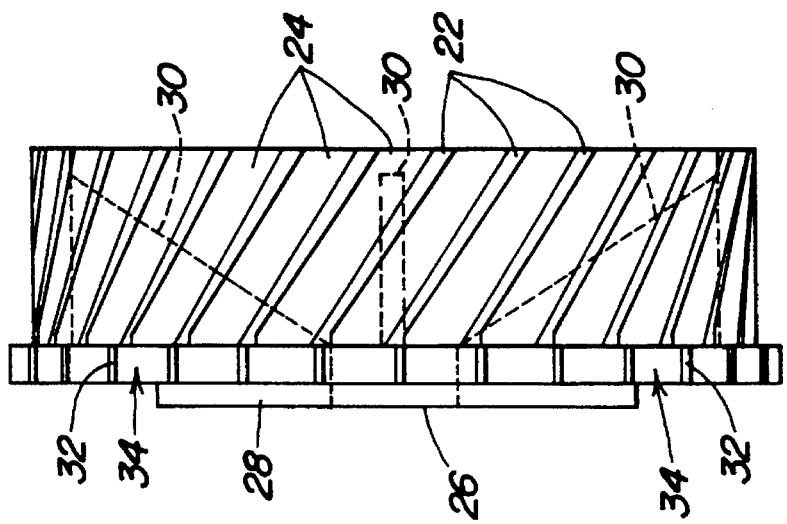
FIG. 4 is a front view of the metering drum.
Figure 3:
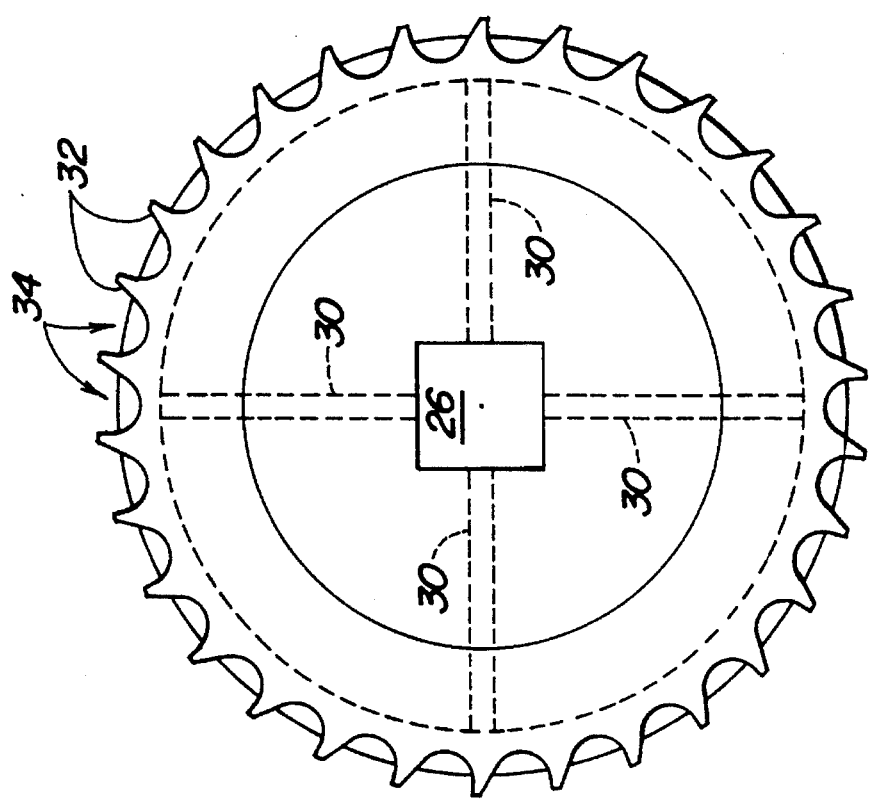
FIG. 3 is a side view of the metering drum.

The seed meter 10 of the present invention comprises a casing 12 having an inlet 14 and an outlet 16. A metering drum 20 is rotatively mounted in the casing and is provided with a plurality of radially extending flutes 22 defining seed receiving valleys 24. The flutes and valleys are angled as illustrated in FIG. 4. The inner casing substantially conforms to the outer circumference of the metering drum except for the relief area 18 located immediately downstream from the outlet 16.

The metering drum 20 is a molded plastic part having a square aperture 26 for receiving a drive shaft and a circular axially extending lip 28 for mounting the drum in a circular receiving aperture in the casing. The hollow metering drum is provided with four reinforcing buttresses 30.

The metering drum is provided with a seed dispensing side wherein the flutes are provided with upwardly extending fingers 32 that define seed receiving pockets 34. The width of the fingers and pockets is dictated by the width of the seed to be singled. If smaller seeds are being planted, the seed pockets accept more than one seed and functions as a volumetric meter.

The inside of the casing is provided with a flexible isolator 40 and a holding comb 42. In the illustrated embodiment, the flexible isolator comprises a dividing comb, however a brush may be substituted for the dividing comb. The flexible isolator divides the space between the metering drum and the casing into the seed receiving space and the seed dispensing space. The flexible isolator 40 is provided with bristles that project inwardly into the seed receiving valleys 24 of the metering drum 20.

The front portion 44 of the dividing comb 40 is tapered to drive seed in the seed receiving valleys 24 and not in the seed pockets 34, away from the seed dispensing side of the metering drum. Seed located in the seed pockets 34 is held in place by the holding comb 42. The holding comb comprises a holding means for holding the seeds in the seed pockets. The holding comb has shorter times than the dividing comb. The tines of the holding comb only extend to the top of the outwardly extending fingers 32.

As the metering drum 20 is rotated clockwise from the seed receiving space to the seed dispensing space across the dividing comb, single seeds located in the seed pockets 34 are held in place by the holding comb 42. The singled seeds are maintained in the seed pockets until they reach approximately the three o'clock position where the holding comb ends. At this point the singled seeds are directly over the outlet 16 and are forced outwardly from the pockets by centrifugal force and fall into the outlet 16. The empty pockets would then continue to rotate through the seed dispensing space back into the seed receiving space where they would pick up new seeds.

Seeds not located in the pockets 34 are driven sideways by the tapered portion of the dividing comb 40 and are prevented from passing from the seed receiving space to the seed dispensing space. As shown in FIG. 2 the dividing comb does not extend across the meter. Seeds driven away from the seed dispensing space are rotated in the seed receiving valleys in the seed receiving space at the same speed as the singled seeds on the dispensing space. In this way as the empty seed pockets 34 pass out of the seed dispensing space to the seed receiving space, the pockets 34 are easily reloaded by seeds already having the same rotational speed as the seed pockets 34.

A flow regulating comb 50 is mounted transversely across the casing in the seed receiving space adjacent to the tapered portion 44 of the holding comb 40. The flow regulating comb 50 helps to keep the seed evenly distributed in the seed receiving valleys 24 and helps to prevent the seed from overloading and short circuiting the dividing comb 40.

A sealing comb 60 is located immediately downstream of the outlet 16 and is essentially a disjointed portion of the holding comb. The sealing comb 60 prevents seed from passing directly from the relief area 18 into the outlet 16 and thereby short circuiting the seed meter.

The unrolled combs, except for the flow regulating comb, are illustrated in FIGS. 5 and 6. These combs maybe secured to the inner periphery of the casing by a releasable fastening means 64, such as similar hook and loop fasteners, or the combs maybe permanently secured by adhesives.

The dividing, holding, flow regulating and sealing combs are formed from flexible and resilient strips of polyurethane that are notched to form tines. The dividing comb is formed from a thin strip of polyurethane. The strip used to form the dividing brush is notched laterally to form pointed tines 62. In addition, the strip is cut at an angle to form the angled side 64 of the tine 62, see FIG. 2. In the illustrated embodiment, the polyurethane strip used to form the holding comb is shorter and thicker than the strip used to form the dividing comb. As such this strip is notched laterally to form the holding tines 66 and notched longitudinally to form a double row of tines. It should be noted that the width of the holding comb is dictated by the width of the seed receiving pockets. The sealing comb is essentially a detached extension of the holding comb and is formed in an identical manner. The flow regulating comb is a thin strip polyurethane in the form of a sheet. The sheet is notched to form wide flat tines.

It should be noted that brushes could be substituted for the various combs, and as such the invention should not be limited to the above described embodiment, but should be limited solely by the claims that follow.

We claim:

1. A seed meter for metering seeds for a piece of seeding equipment, the seed meter comprising:

a casing having an inlet for receiving seed and an outlet for dispensing seed;

a metering drum rotatively mounted in the casing, the drum is provided with a plurality of radially extending flutes which extend across the drum and between which are located a plurality of seed receiving valleys, the drum and the casing defining a space;

a dividing comb mounted to the casing and dividing the space formed between the drum and the casing into a seed dispensing space and a seed receiving space, the seed receiving space being in communication with the inlet of the casing and the seed dispensing space being in communication with the outlet of the casing, the metering drum is provided with a seed dispensing side that rotates through both the seed receiving space and the seed dispensing space, the flutes on the seed dispensing side of the metering drum being provided with outwardly extending fingers that form seed receiving pockets; and a seed holding comb mounted to the casing for holding seed in the seed receiving pockets, whereby as the drum is rotated in the casing the seed is trapped in the seed receiving pockets and passed from the seed receiving space to the seed dispensing space where it is released by the holding comb and passes through the outlet.

2. A seed meter as defined by claim 1 wherein the metering drum is provided with angled flutes.

3. A seed meter as defined by claim 2 wherein the dividing comb has tines that extend into the seed receiving valleys of the metering drum.

4. A seed meter as defined by claim 3 further comprising a sealing comb located adjacent to the dividing comb and the outlet for preventing seed from prematurely entering the outlet.

5. A seed meter as defined by claim 4 wherein a portion of the dividing comb is tapered to drive seed away from the seed dispensing side of the metering drum.

6. A seed meter as defined by claim 5 wherein a flow regulating comb is mounted to the casing adjacent to the tapered portion of the divider comb to more uniformly load the seed receiving valleys.

7. A seed meter as defined by claim 5 wherein the casing is provided with a relief space immediately downstream of the outlet.

8. A seed meter for metering seeds for a piece of seeding equipment, the seed meter comprising:

a casing having an inlet for receiving seed and an outlet for dispensing seed;

a metering drum rotatively mounted in the casing, the drum is provided with a plurality of radially extending flutes which extend across the drum and between which are located a plurality of seed receiving valleys, the drum and the casing defining a space;

a flexible isolator for dividing the space formed by the metering drum and the casing into a seed receiving space and a seed dispensing space, the seed receiving space being in communication with the inlet of the casing and the seed dispensing space being in communication with the outlet of the casing, the metering drum is provided with a seed dispensing side that rotates through both the seed receiving space and the seed dispensing space, the flutes on the seed dispensing side of the metering drum being provided with outwardly extending fingers that form seed receiving pockets; and a holding means for holding seed in the seed receiving pockets, whereby as the drum is rotated in the casing the seed is trapped in the seed receiving pockets and passed from the seed receiving space to the seed dispensing space through the flexible isolator means where it is released by the holding means and passes through the outlet.

9. A seed meter as defined by claim 8 wherein the metering drum is provided with angled flutes.

10. A seed meter as defined by claim 9 wherein the flexible isolator is mounted to the casing and extends into the seed receiving valleys of the metering drum.

* * * * *